March 5, 1935.  M. RASMUSSEN  1,993,114
FISHING LINE SINKER
Filed March 27, 1933
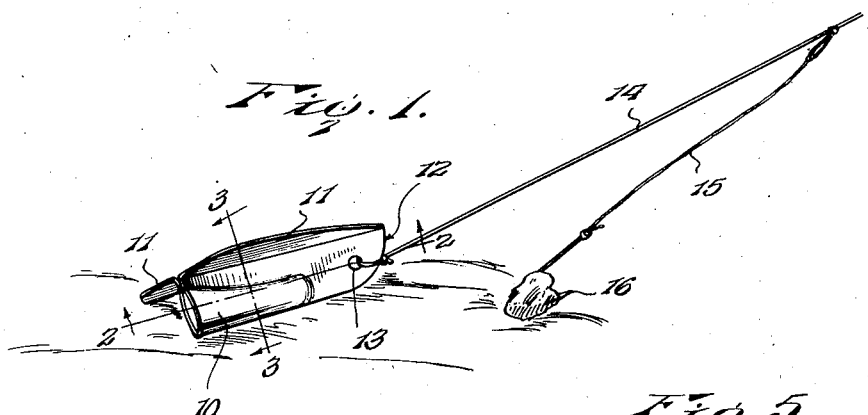
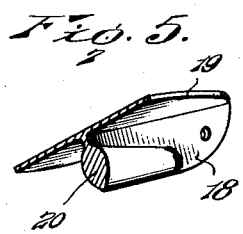
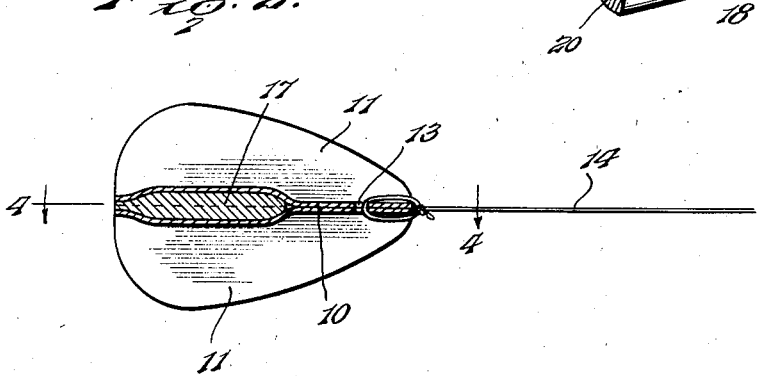
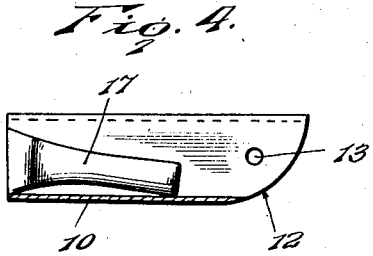
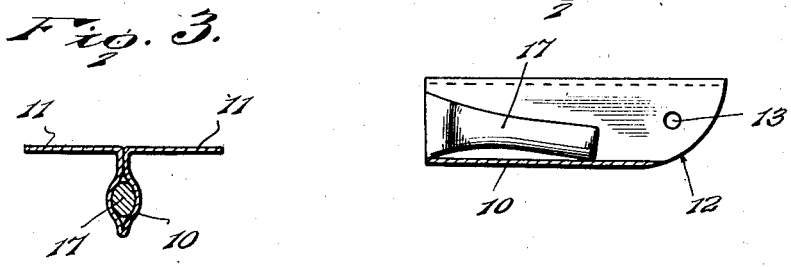
Inventor
M. Rasmussen.
By Lacey & Lacey
Attorneys Patented May. 5, 1935

1,993,114

UNITED STATES PATENT OFFICE 1,993,114

FISHING LINE SINKER

Martin Rasmussen, Galveston, Tex.

Application March 27, 1933, Serial No. 663,048

2 Claims. (Cl. 43—52)

This invention relates to an improved sinker for fishing lines and seeks, among other objects, to provide a sinker which, when resting on the bottom, will not roll about nor be dislodged by water currents.

A further object of the invention is to provide a sinker embodying a center fin and angularly disposed wings at opposite sides of the fin so that, when the sinker is submerged, the sinker will rest, in tilted position, on the fin and either one or the other of said wings whereby the wing engaging the bottom will be disposed to dig into the bottom for anchoring the sinker.

Another object of the invention is to provide a sinker wherein the wings will, when the sinker is pulled upwardly, cause the sinker to rise to the top of the water and prevent snagging of the hooks or undue dragging of the hooks upon the bottom.

And the invention seeks, as a still further object, to provide a sinker which may either be fabricated or cast as a unit and wherein the sinker when fabricated will embody a weight which may be readily removed and, if desired, a larger or smaller weight installed.

With the foregoing and other objects in view, the invention consists in certain novel features illustrated in the accompanying drawing and hereinafter fully described and claimed.

In the accompanying drawing forming part of this specification, Figure 1 is a perspective view of my improved sinker, a conventional fishing line and hook being shown in connection therewith, Fig. 2 is a sectional view on the line 2—2 of Fig. 1, Fig. 3 is a transverse section on the line 3—3 of Fig. 1, Fig. 4 is a longitudinal section on the line 4—4 of Fig. 2, and Fig. 5 is a sectional view showing a variation of the invention.

In carrying the invention into effect, I employ a substantially spatulate blank of resilient sheet metal which is bent medially to provide a longitudinal channel shaped fin 10 from the side walls of which extend in opposite directions a pair of flat lateral wings 11 disposed in a plane common thereto at substantially a right angle to the fin. As will be observed upon reference to Fig. 2, the wings gradually increase in width from their forward ends towards their rear ends while the rear ends of the wings are rounded so as to obviate the presence of sharp corners. Furthermore, as will be observed upon reference to Fig. 4, the blank is provided at the forward end of the fin 10 with a notch the edges of which are convex so that when the blank is folded, the forward ends of the side walls of the fin are rounded, as indicated at 12, so as to obviate catching or snapping of the fin in the practical use of the device. Formed through the side walls of the fin 10 near the forward end thereof are alined openings 13 to receive a fishing line, as conventionally shown at 14, a snell 15 and hook 16 being illustrated in conjunction with the line.

The folded blank, as just described, provides the body of the device and clamped within the channel of the fin 10 is a weight 17 for the body. This weight is preferably of lead and is, as shown in Fig. 4, widened towards its rear end so that the rear end of the sinker will be somewhat heavier than the forward end thereof. The side walls of the fin 10 are, as brought out in Fig. 3, bent about the weight so as to enclose and grip said weight for firmly holding it in position but, in this connection, attention is directed to the fact that by flexing the side walls of the fin apart, either a heavier or lighter weight may be readily installed.

As will now be seen, when the sinker is submerged, it will, as suggested in Fig. 1, rest at the bottom upon the fin 10 with either one or the other of the wings 11 engaged with the bottom. The wing so engaged with the bottom will, as will be appreciated, prevent shifting of the sinker by water currents and, of course, the sinker will also be prevented from rolling about upon the bottom. When pull is exerted upon the line 14, the forward end of the sinker will be lifted and since the major portion of the weight 17 is disposed rearwardly of the longitudinal center of the sinker, the wings 11 will be directed upwardly to assume an inclined position trailing the line with the result that the wings will coact with the water for quickly raising the sinker to the surface. Undue dragging of the hooks with consequent danger of snagging will thus be avoided. I accordingly provide a particularly simple and efficient device for the purposes set forth and, as will now be appreciated, a device which may be produced at moderate cost.

In some instances, I may prefer to cast the sinker of lead and antimony, as a solid unit, and in Fig. 5 of the drawing I have shown the sinker so constructed, it being understood, of course, that while I have mentioned the use of resilient sheet metal, lead and antimony, the invention is not limited in this respect and the sinker may be made of any material found most suitable. In Fig. 5, the center fin of the sinker is indicated at 18 and projecting laterally therefrom at the upper edge of the fin are wings 19. At its rear end portion, the fin 18 is thickened to provide a weight 20 gradually increasing in size towards the rear end of the fin, like the weight 17. In this modified construction, however, the fin, wings and weight are cast as an integral solid unit. Otherwise, the construction is identical with the form of the invention first described.

Having thus described the invention, I claim:

1. A fishing line sinker adapted to anchor the fishing line including a body provided with a longitudinal fin and having wings extending laterally from the side walls thereof, the wings lying in a plane common thereto at substantially a right angle to the fin whereby either wing may enter the bed of a stream, and a weight extending longitudinally of the rear end portion of the fin, the fin at its forward end being constructed to facilitate attachment of a line.

2. A fishing line sinker adapted to anchor the fishing line including a body formed from a blank bent to provide a medial longitudinal channel shaped fin rounded at its forward end and having alined abutting wings extending laterally in opposite directions from the top of the fin in a common plane, and a weight clamped within the rear end of said fin, the fin having a line-receiving opening at its forward rounded end.

MARTIN RASMUSSEN. [L. S.]